United States Patent [19]
Sizemore et al.

[11] Patent Number: 5,529,536
[45] Date of Patent: Jun. 25, 1996

[54] EVAPORATIVE COOLING/HUMIDIFING OF A MOTOR VEHICLE'S INTERIOR AIR, UTILIZING THE VEHICLE'S AS DESIGNED POWERED VENTALATION SYSTEM

[76] Inventors: Timothy J. Sizemore, 2064 Silverfield Loop, Redding, Calif. 96002; Bryan Redd, 6325 Borg Cir., Ogden, Utah 84403

[21] Appl. No.: 255,005

[22] Filed: Jun. 7, 1994

[51] Int. Cl.$^6$ ................................................ B60H 1/32
[52] U.S. Cl. .................... 454/157; 62/310; 236/44 B; 236/44 C
[58] Field of Search ............................ 62/244, 271, 304, 62/310, 314; 454/157; 236/44 C, 44 B

[56] References Cited

U.S. PATENT DOCUMENTS

| | | | |
|---|---|---|---|
| 2,342,841 | 2/1944 | Carraway | 236/44 BX |
| 2,780,078 | 2/1957 | Feplitz | 62/310 |
| 2,796,014 | 6/1957 | Montgomery et al. | 62/314 X |
| 2,800,306 | 7/1957 | Freeman | 62/314 X |
| 4,261,930 | 4/1981 | Walker | 454/157 X |
| 4,658,597 | 4/1987 | Situm | 454/157 X |
| 4,913,034 | 4/1990 | Ripple et al. | 454/157 |
| 5,337,582 | 8/1994 | Santos | 62/310 |

FOREIGN PATENT DOCUMENTS 106337  6/1983  Japan .................................. 62/314

*Primary Examiner*—Harold Joyce
*Attorney, Agent, or Firm*—A. Ray Osburn

[57] ABSTRACT

A device for evaporatively cooling the passenger interior of a motor vehicle, utilizing the vehicle ventiliation ducting and blower. An electrical pump provides water from a vehicle-mounted reservoir to a spray nozzle mounted to discharge into ventilating air entering the outside air inlet of the ventilation ducting.

2 Claims, 3 Drawing Sheets

EVAPORATIVE COOLING/HUMIDIFING OF A MOTOR VEHICLE'S INTERIOR AIR, UTILIZING THE VEHICLE'S AS DESIGNED POWERED VENTALATION SYSTEM

BACKGROUND—FIELD OF THE INVENTION

This invention relates to cooling and/or humidifying of motor vehicles' interior air, specifically to cooling and/or humidifying utilizing the as designed powered ventilation system.

BACKGROUND—DESCRIPTION OF PRIOR ART

Motor vehicle interior cooling predominantly relies on chlorofluorocarbon (CFC) based coolant air conditioning. Recently, environmental laws have mandated CFC production to cease. Non-production of CFC may cause difficulties with purchasing, service, and repair. This problem has been partially solved by introducing a non-CFC coolant.

However, the new non-CFC coolant is not compatible with current CFC coolant components. Accordingly, major replacement of components is required to convert CFC coolant systems to non-CFC coolant systems. Thus, conversion of current CFC coolant systems may not be practical for most motor vehicles.

Furthermore, many motor vehicles have no cooling of interior air, possibly because of availability of CFC coolant, purchase price, personal opposition and lack of choice. Motor vehicle owners will require an alternative cooling system when their existing CFC coolant system breaks. Additionally, no humidifying of the vehicle's interior air is realized with freon based cooling.

BRIEF SUMMARY OF THE INVENTION

The invention comprises means for introducing water as a coolant into the incoming air drawn into vehicles through existing ventilation ducting by existing air blowers carried by the vehicles.

Accordingly, several objects and advantages of the present invention are:

(a) to provide cooled and/or humidified air to the interior of a motor vehicle;

(b) to provide a non-toxic coolant;

(c) to provide cooled and/or humidified air without a load to the motor;

(d) to provide cooled and/or humidified air with the engine on or off;

(e) to provide cooled and/or humidified air with reduced fuel use;

(f) to provide cooled and/or humidified air without alteration of or interference with existing powered ventilation systems;

(g) to provide added passenger safety with cooled and/or humidified air when vehicle's windows are closed.

Further objects are to provide an easily manufactured, serviced, maintained and simple to use system without alteration of or interference with existing powered ventilation systems, which can be used with or without an existing freon air conditioning system. Still further objects and advantages will become apparent from consideration of the ensuing description and drawings.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
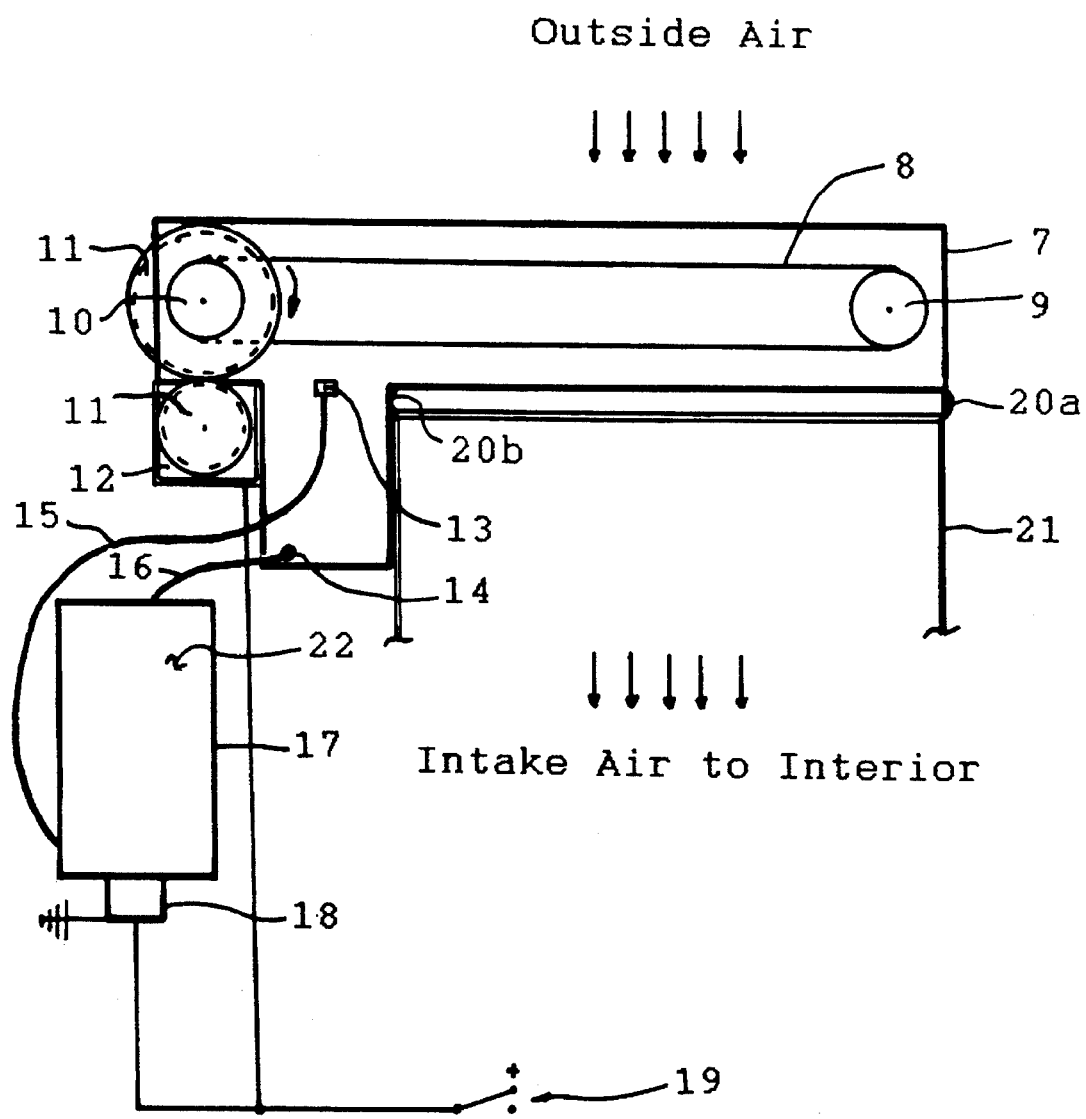
FIG. 1 is a schematic side view of an embodiment having a movable pad and water spray.

A typical embodiment of the above invention is illustrated in FIG. 1. The housing 7 is made of rigid plastic with a flexible seal 20b and 20a securing the housing to the intake 21. The pad 8 is of low density, absorbent continuous fiber and is of a predetermined size. Rollers 9 and 10 are made of soft rubber with rigid cores held by holes molded in the housing. Pad tension is supplied by spring action to roller 9. Drive roller 10 is driven by meshing gears 11 powered by a 12 volt direct current motor 12.

Tank 17 is made of rigid plastic and secured with common fasteners to the vehicles firewall in such a way as to allow continuous draining of coolant. Pump 18 is threaded underneath the tank 17 and supply line 15 and drain line 16 are made of flexible plastic tubing. Switch 19 is of a single throw direct current on/off type located on the vehicle's interior panel. Coolant 22 is pumped through supply line 15 to a spray nozzle 13 onto pad 8. Excess water flows through drain fixture 14 and drain line 16 back to tank 17.

Figure 3:
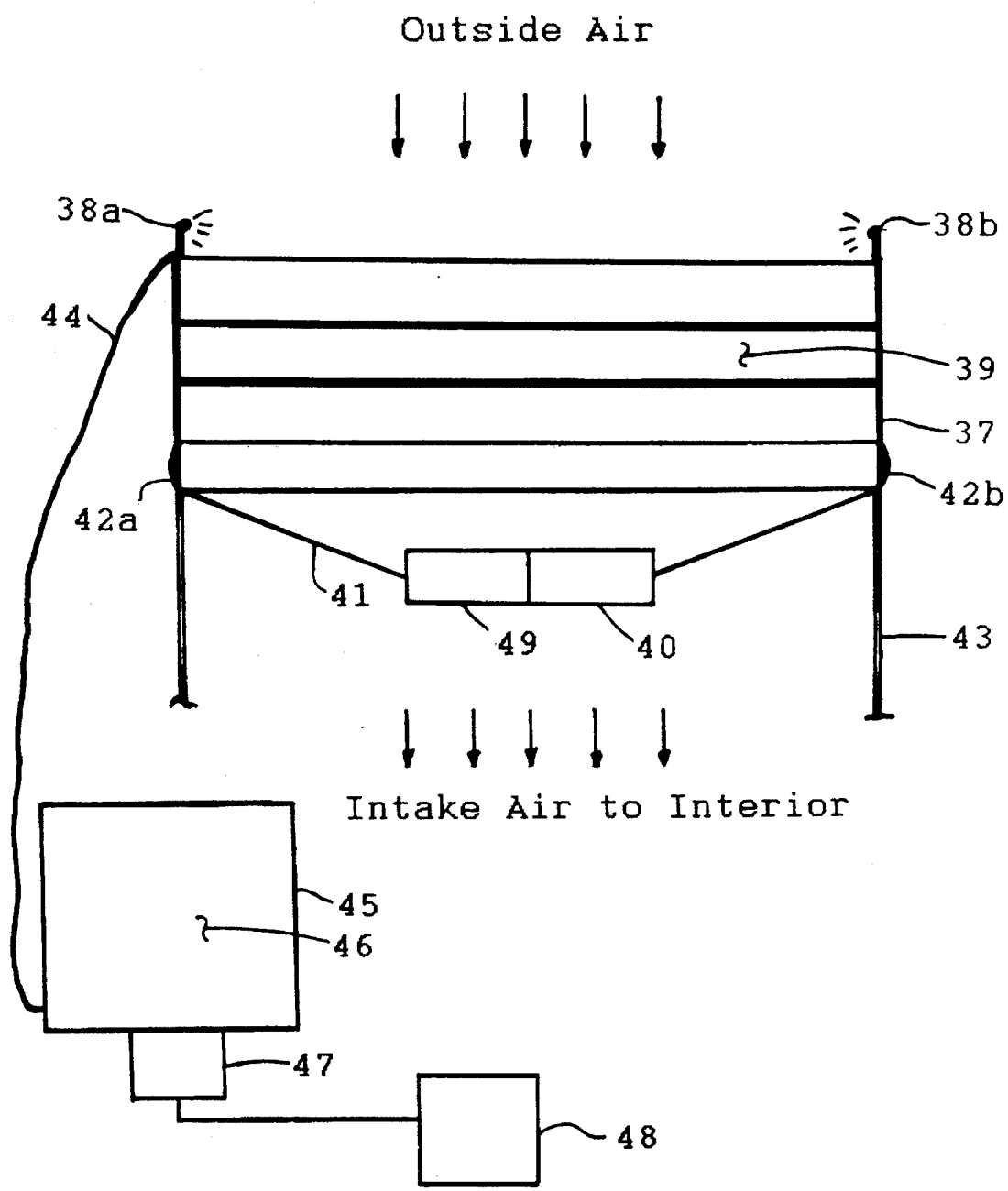
FIG. 3 is a schematic side view of an embodiment having a fixed pad and a water spray, which can operate with or without the pad.

There are various evaporative cooling and/or humidifying devices to accomplish the invention. FIG. 3 shows a fixed pad 39 with the coolant 46 applied at a rate controlled by temperature and/or humidity sensors 49 and 40 respectively, held by bracket 41. This device could operate with or without the pad 39, depending on the desired output. The main concern is to supply a predetermined amount of coolant 46 at the intake 43 of the powered ventilation system. Seals 42a and 42b are provided between the ventilation system intake 43 and the housing 37. Coolant 46 from tank 45 is impelled by pump 47 through supply line 44 to spray nozzles 38b and 38a. The operation of pump 47 is activated and controlled by a switch and/or controller 48.

Figure 2:
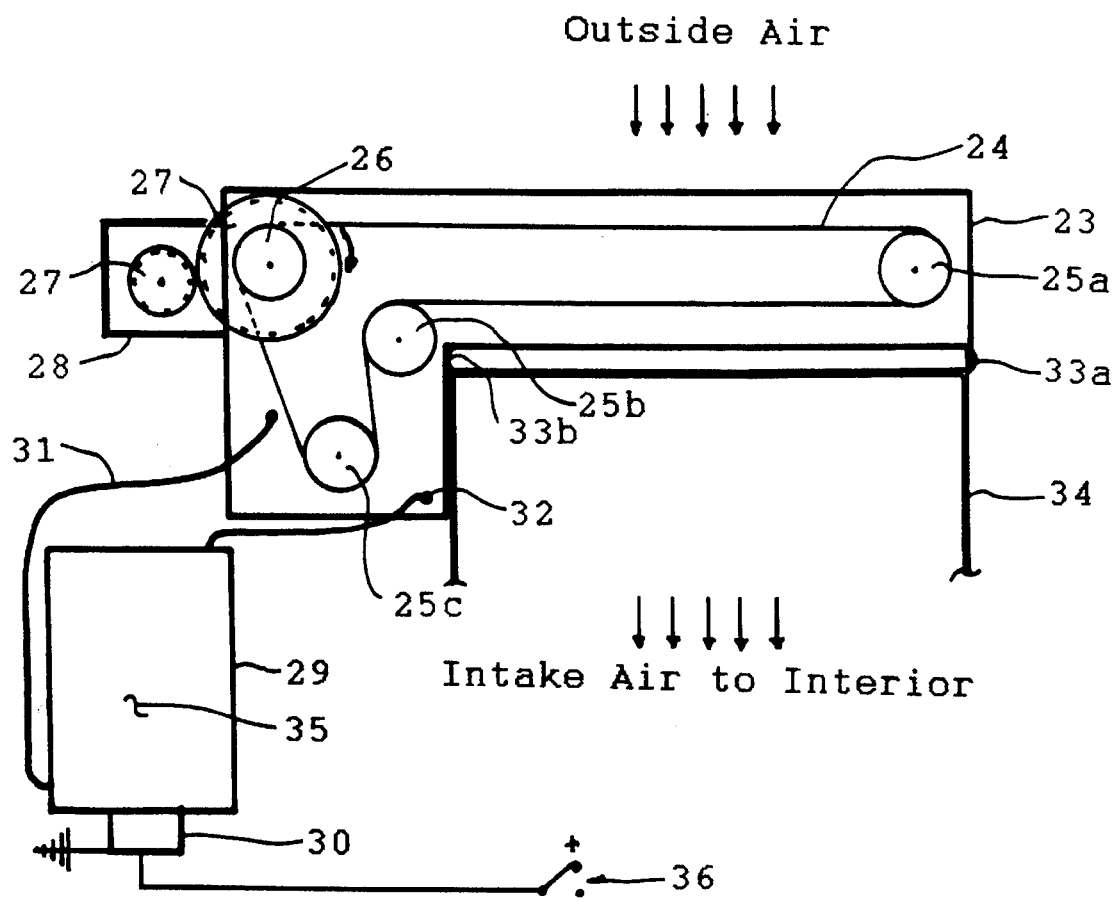
FIG. 2 is a schematic side view of an embodiment having a movable pad and a water well.

Another embodiment, although similar to that of FIG. 1, is illustrated in FIG. 2, differing principally in that moving pad 24 dips into a water containing portion of housing 23, guided by rollers 25a, 25b and 25c. Movement of pad 24 is provided through meshing gear 27 powered by motor 28 to rotate drive roller 26. Coolant 35 is impelled by pump 30 from tank 29 through supply line 31 to housing 23. A drain fitting and line 32 returns excess water to tank 29. Pump 30 is controlled by a switch 36. Seals 33a and 33b operate between housing 23 and ventilation intake 34.

From the descriptions above, a number of advantages of the evaporative cooling and/or humidifying method become evident:

(a) A simple on/off switch located on the interior panel controls operation.

(b) Installation at the intake of the powered ventilation system is simple.

(c) No alteration of or interference with the existing powered ventilation system is needed.

(D) Cooled and/or humidified interior air is provided without any accessories to the interior of the vehicle.

Operation

The manner of using the evaporative cooling and/or humidifying system installed at the intake of the powered ventilation system is simple. For example in the embodiment of FIG. 1, when the switch 19 is activated the pad (8) rotates and coolant (22) is applied. At the same time the powered ventilation system is activated to allow outside ventilation to enter the system. As the coolant is applied and the pad rotates outside air going through the pad is cooled and/or humidified. Excess coolant is returned through the drain line 16 and resupplied to the pad. The tank 17 and pump (18) supply coolant to the pad. When the system is turned off the pad stops rotating and coolant stops. The vehicles powered ventilation system continues to operate as before. While the switch 19 is activated continuous cooled and/or humidified air is allowed to enter the powered ventilation system for distribution to the vehicle's interior. When the system is deactivated the powered ventilation system operates as before.

Summary

Accordingly, the reader will see that the method of providing cooled and/or humidified air through the existing powered ventilation system is easy and convenient and does not alter or interfere with the powered ventilation system.

Furthermore, cooling and/or humidifying is accomplished with non-toxic coolant and no increased load to the engine, resulting in reduced fuel usage and engine heat. Consumers would have a choice for interior cooling.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

We claim:

1. A device for evaporatively cooling the passenger interior of a motor vehicle having a powered ventilation system comprising an air duct distribution assembly with an outside air inlet, and a vehicle powered air blower, said device comprising:

a housing sized and shaped to engage the periphery of said outside air inlet substantially sealably all around;

a reservoir for evaporative cooling water;

at least one water spray nozzle;

an electrically powered water pump and water conduit means for delivery of water under pressure from the reservoir to the spray nozzle;

means mounting the spray nozzle upon the housing positioned and oriented to discharge into air entering said outside air inlet;

evaporatively cooled incoming air temperature and humidity sensing means installed within the housing at said outside air inlet; and means automatically controlling the operation of the pump, to deliver a predetermined amount of water to the spray nozzle for efficient cooling as indicated by temperature and humidity signals from the sensing means.

2. The evaporative cooling device of claim 1, further comprising:

an air porous evaporation pad installed across the housing between the water spray nozzle and the outside air inlet to the air duct distribution assembly.

* * * * *

UNITED STATES PATENT AND TRADEMARK OFFICE
CERTIFICATE OF CORRECTION

PATENT NO. : 5,529,536
DATED : June 25, 1996
INVENTOR(S) : Sizemore, et al

It is certified that error appears in the above-identified patent and that said Letters Patent is hereby corrected as shown below:

On the title page, item [54] and column 1, line 1, in the title, should read
-- EVAPORATIVE COOLING AND/OR HUMIDIFYING OF A MOTOR VEHICLE'S INTERIOR AIR, UTILIZING THE VEHICLE'S AS DESIGNED POWERED VENTILATION SYSTEM --

Signed and Sealed this

Seventeenth Day of March, 1998

*Attest:*

BRUCE LEHMAN

*Attesting Officer*  *Commissioner of Patents and Trademarks*